(12) United States Patent
Samuel

(10) Patent No.: US 8,836,179 B2
(45) Date of Patent: Sep. 16, 2014

(54) SYSTEMS AND METHODS OF ENERGY HARVESTING WITH POSITIVE DISPLACEMENT MOTOR

(75) Inventor: Robello Samuel, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 522 days.

(21) Appl. No.: 13/242,798

(22) Filed: Sep. 23, 2011

(65) Prior Publication Data

US 2012/0228877 A1 Sep. 13, 2012

Related U.S. Application Data

(60) Provisional application No. 61/451,351, filed on Mar. 10, 2011.

(51) Int. Cl.
| | |
|---|---|
| *H01L 41/00* | (2013.01) |
| *F03D 9/00* | (2006.01) |
| *E21B 41/00* | (2006.01) |
| *F04C 2/107* | (2006.01) |
| *H02N 2/18* | (2006.01) |
| *F03B 13/02* | (2006.01) |
| *F03B 13/00* | (2006.01) |

(52) U.S. Cl.
CPC ............. *H02N 2/18* (2013.01); *E21B 41/0085* (2013.01); *F04C 2/1075* (2013.01); *F03B 13/02* (2013.01); *F03B 13/00* (2013.01)
USPC ................. 310/26; 290/44; 290/52

(58) Field of Classification Search
CPC ...................................................... H01L 41/00
USPC ........................................ 310/26; 290/44, 52
See application file for complete search history.

(56) References Cited

U.S. PATENT DOCUMENTS

| | | | | |
|---|---|---|---|---|
| 2,328,496 | A | * | 8/1943 | Rocard .......................... 367/168 |
| 3,294,994 | A | * | 12/1966 | Anderson ........................ 310/82 |
| 3,350,583 | A | * | 10/1967 | Schiavone .................... 310/319 |
| 4,864,548 | A | * | 9/1989 | Butler ........................... 367/155 |
| 5,747,915 | A | * | 5/1998 | Benavides .................... 310/331 |
| 7,816,797 | B2 | | 10/2010 | Nair |
| 7,816,799 | B2 | | 10/2010 | Nair et al. |
| 7,816,833 | B2 | | 10/2010 | Nair |
| 2010/0127582 | A1 | * | 5/2010 | Nair et al. ........................ 310/26 |
| 2010/0308670 | A1 | | 12/2010 | Nair et al. |
| 2012/0228875 | A1 | * | 9/2012 | Hardin et al. .................... 290/52 |
| 2013/0099500 | A1 | * | 4/2013 | Heisig et al. .................... 290/52 |

FOREIGN PATENT DOCUMENTS

JP 2002-013989 A * 1/2002 ................ G01L 3/10

* cited by examiner

*Primary Examiner* — Thomas Dougherty
(74) *Attorney, Agent, or Firm* — Alan Bryson; Baker Botts L.L.P.

(57) ABSTRACT

A system to harvest energy from shaft rotation includes a housing, a curved shaft disposed within the housing, and a magnetostrictive material embedded in the housing. A rotation of the curved shaft strains the magnetostrictive material, generating an electrical current in a conductor disposed proximate to the magnetostrictive material.

19 Claims, 7 Drawing Sheets

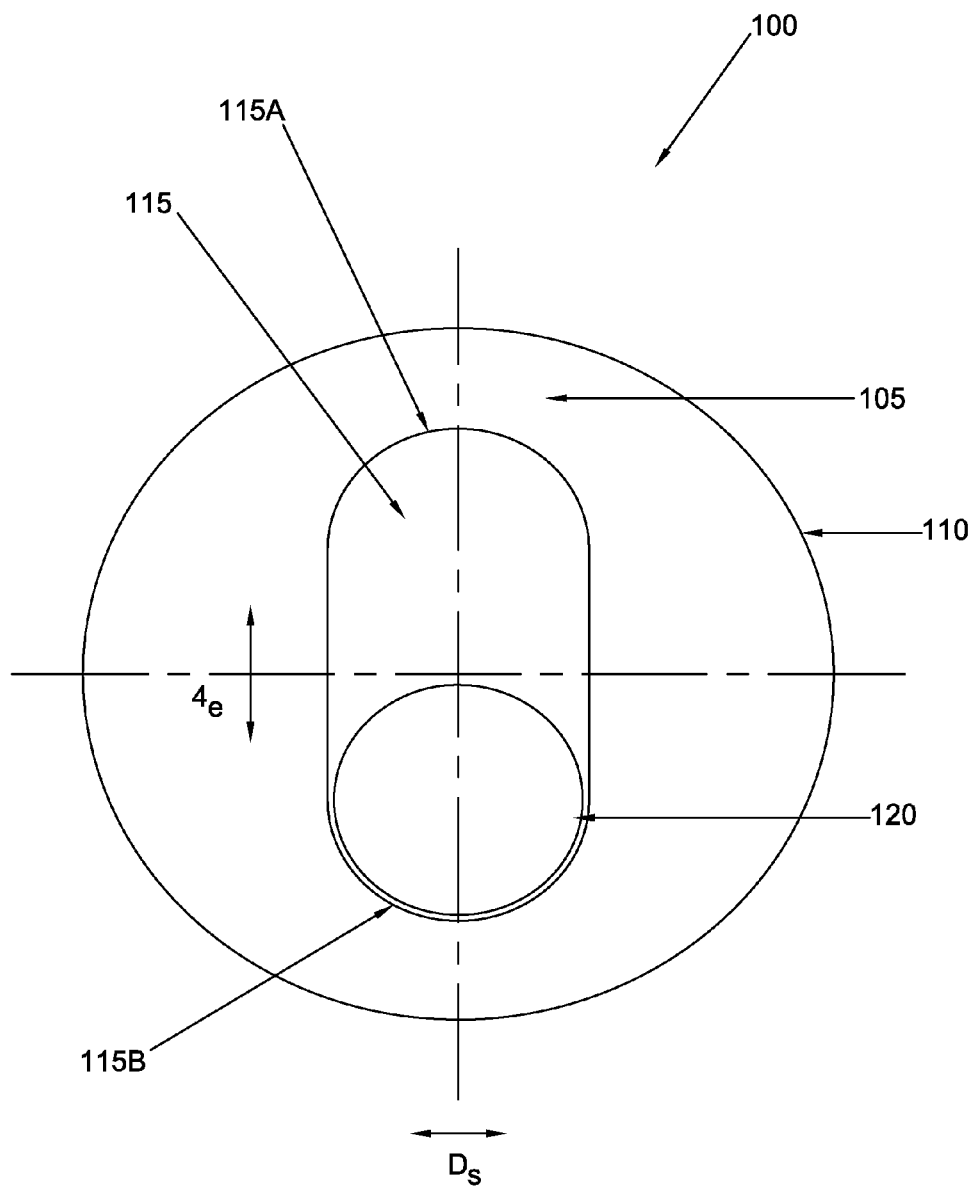

SYSTEMS AND METHODS OF ENERGY HARVESTING WITH POSITIVE DISPLACEMENT MOTOR

CROSS-REFERENCE TO RELATED APPLICATION

This application claims the benefit of U.S. Provisional Application No. 61/451,351, which was filed Mar. 10, 2011 and is hereby incorporated by reference in its entirety.

BACKGROUND

The present disclosure relates generally to wellbore operations and, more particularly, to systems and methods of harvesting energy in a wellbore with a positive displacement motor.

The recent increase in deepwater and ultra-deep wells has triggered a need for reliable downhole tools which can stay downhole for long hours. It is well known that downhole tools are run with measurement, while drilling tools and other instrumented bottomhole assembly steer the system in the proper direction. All these tools need power which is either stored in batteries or conveyed to the tool through umbilical cords. Supply of a suitable amount of power to these tools is necessary to ensure the tools work effectively and stay downhole for long hours along with other tools. As is well known, batteries have the capability of storing only a finite amount of power therein and have environmental limits, such as temperature, on their use. Frequent battery power pack replacement or failure of the tools during the operation incrementally increases the operating cost despite deriving potential benefits from using these tools. What is needed for such a system in order to manage power is a tool to generate power downhole. The required tool or system should be able to produce power by reclaiming the energy lost downhole instead of using the hydraulic energy conveyed downhole.

BRIEF DESCRIPTION OF THE DRAWINGS

Some specific exemplary embodiments of the disclosure may be understood by referring, in part, to the following description and the accompanying drawings.

FIG. 1A depicts a partial cross-sectional view of an exemplary positive displacement motor, in accordance with certain embodiments of the present disclosure.

Figure 1B:
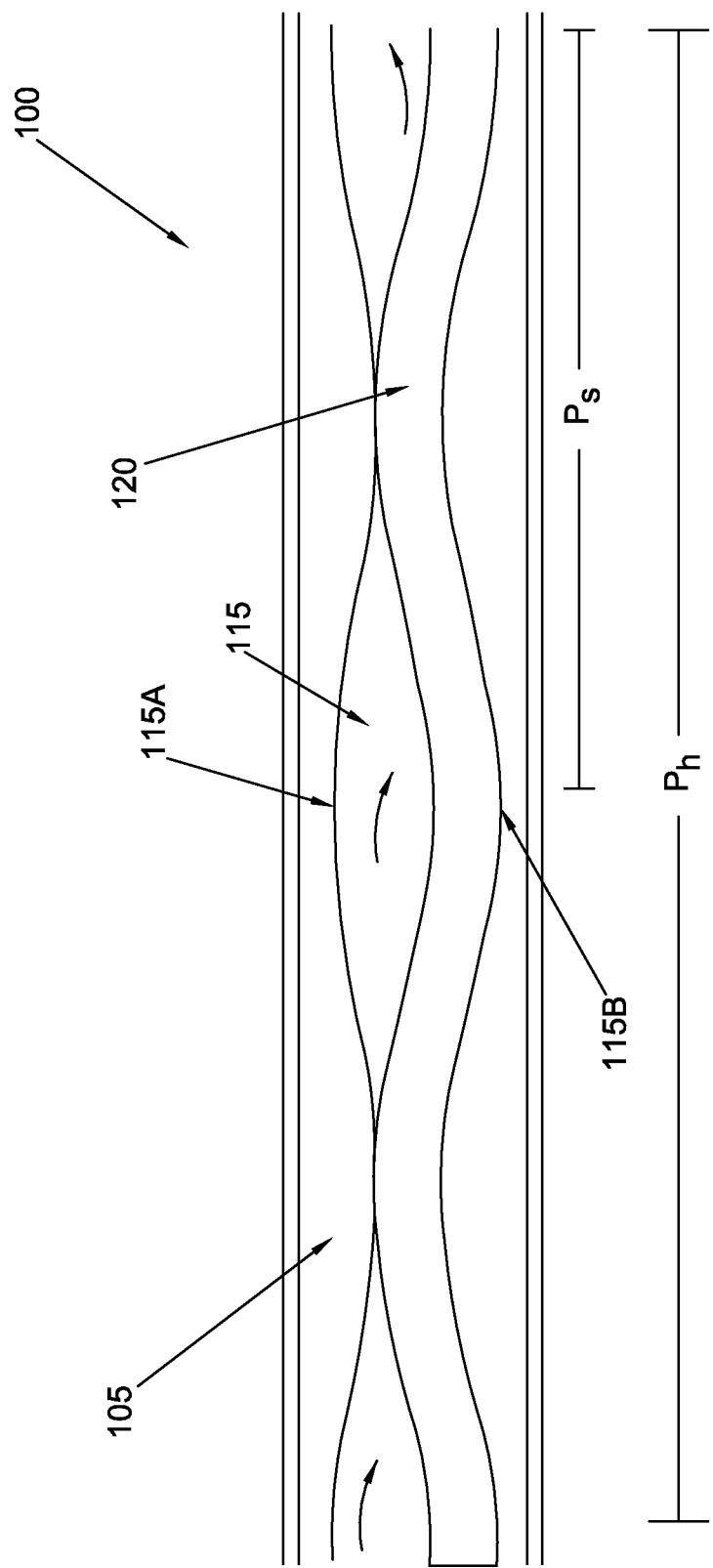
FIG. 1B depicts a partial side view of the positive displacement motor an exemplary positive displacement motor, in accordance with certain embodiments of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to wellbore operations and, more particularly, to systems and methods of harvesting energy in a wellbore with a positive displacement motor.

Illustrative embodiments of the present disclosure are described in detail herein. In the interest of clarity, not all features of an actual implementation may be described in this specification. It will of course be appreciated that in the development of any such actual embodiment, numerous implementation specific decisions must be made to achieve the specific implementation goals, which will vary from one implementation to another. Moreover, it will be appreciated that such a development effort might be complex and time consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the disclosure. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Devices and methods in accordance with certain embodiments may be used in one or more of wireline, measurement-while-drilling (MWD) and logging-while-drilling (LWD) operations.

This disclosure generally relates to converting energy to a valuable form of useful power that is otherwise wasted with the use of an existing and extensively used downhole tool called a positive displacement motor. Development of hydraulic downhole motors has a long history. The Archimedean screw pump of ancient times consisted of a spiral shaft which, when turned by hand, lifted water from a lake. Rene Moineau, a French engineer was the first to invent and obtain several modified patents for a rotary type pump between 1930 and 1948 and further developed the Archimedean screw pump principle. The basic parts of a Moineau-type motor involves a stator (housing) and a shaft enclosed in a casing. The shaft has a wave-shaped vertical cross-section, and each wave corresponds to a lobe. The housing, which may be contained in a casing, accommodates the wave-shaped rotor having a cross-section that is also wave-shaped, but the number of lobes is one more than in the shaft. Moineau's pump principle is applied in reverse to rotate the shaft by pumping fluid. This results in a positive displacement motor, commonly known as a PDM.

There are different designs for positive displacement motors, but the basic operating principle is common to all. The various designs of the PDMs are identified by the ratio of the number of lobes on the shaft to the number of lobes on the housing. Motors with the lobe patterns, such as 1:2, 3:4, 5:6, and 9:10, are now being used. The ratio is known as kinematic ratio, i, of the motor.

FIG. 1A depicts a partial cross-sectional view of an exemplary positive displacement motor 100, in accordance with certain embodiments of the present disclosure. FIG. 1B depicts a partial side view of the positive displacement motor 100. As depicted, the positive displacement motor 100 may include a housing 105. The housing 105 may include a suitable elastomeric material. An outer casing 110 of any suitable material may surround all or a portion of the housing 105. The housing 105 may form a cavity 115 having lobes 115A and 115B. A shaft 120 may be disposed within the cavity 115 and may be a single-lobed shaft. As depicted, a pitch of the shaft 120 is denoted as $p_s$, and a pitch of the housing 105 is denoted as $p_h$. Accordingly, the displacement motor 100 may be an example of a 1:2 lobe configuration providing an eccentric rotation of the shaft 120 in operation.

The eccentric rotation of the shaft 120 may be a source of vibration. With conventional motors having such eccentricity, the life of the motor may be reduced due to undesirable resonant vibration. With certain embodiments according to the present disclosure, the embodiments not only serve as a source of power generation, but also act as a vibration damping mechanism by way of suppressing the resonant mechanical response.

In certain embodiments according to the present disclosure, magnetostrictive technology may be capable of generating electrical power by using the mechanical energy generated from a downhole motor, e.g., during the process of drilling a borehole. Magnetostrictive materials have the ability to convert kinetic energy into magnetic energy that may be used to generate electrical power. Magnetostrictive materials have the property that, when strain is induced in the material, the change in linear dimensions produces a corresponding change in magnetic field about the material. In other words, mechanical loads can deform the material and thereby rotate magnetic domains. The change of the magnetic flux can be used to generate electrical power. A suitable material for the magnetostrictive material may be Terfenol-D, available from Etrema Products, Inc. Various materials, e.g., iron and iron alloys such as Terfenol, may provide suitable magnetostrictive and giant magnetostrictive responses. These materials normally respond to a force applied to their mechanical connection by creating a magnetic field which can be detected, for example, by a surrounding conductor coil.

The exemplary positive displacement motor 100 may be based, at least in part, on the theory of energy-reclamation from the conversion of strain energy induced by the rotation of the shaft to useful electrical energy using magnetostrictive material. The focus may be on the eccentric motion of the shaft 120 inside the elastomeric housing 105. The eccentric motion of the shaft 120 may compress the elastomeric housing 105. The magnetostrictive material embedded in the elastomer may use the strain energy to generate an electrical charge distribution producing a magnetic field which may be converted to electrical energy. In alternative embodiments, instead of or in combination with elastomeric material, the housing 105 may comprise any other suitable material that would allow transfer of the forces of the rotating shaft to strain the magnetostrictive material embedded in the housing 105.

Figure 2:
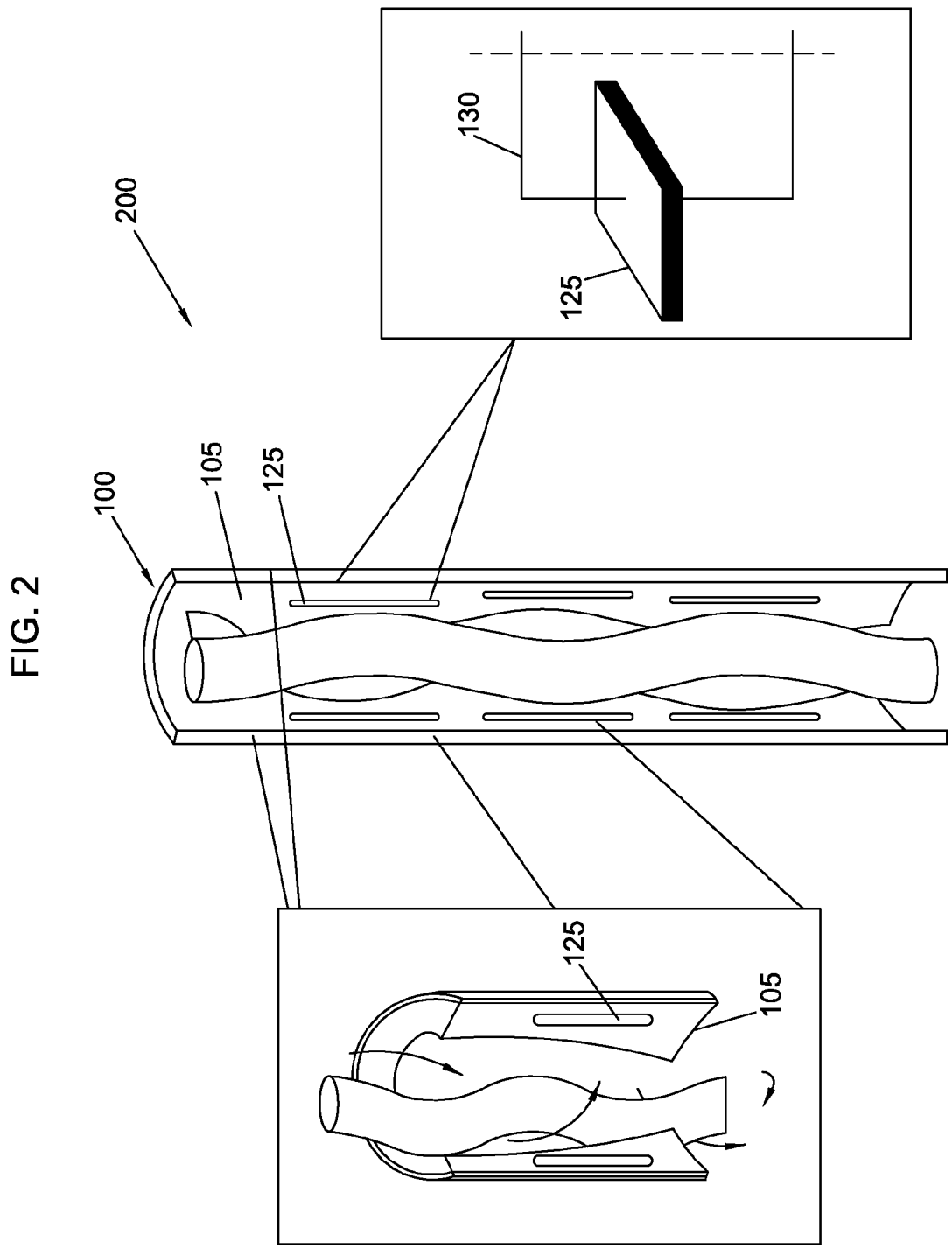
FIG. 2 depicts the electrical and mechanical components in the power section of an exemplary positive displacement motor used in an exemplary coupled electromechanical system, in accordance with certain embodiments of the present disclosure.

FIG. 2 depicts the electrical and mechanical components in the power section of an exemplary positive displacement motor 100 used in an exemplary coupled electromechanical system, in accordance with certain embodiments of the present disclosure. Though the magnetostrictive material 125 embedded in the housing 105 is depicted with exemplary non-limiting form, extent, location, and orientation, the magnetostrictive material 125 may take any suitable form, extent, location, and orientation. One or more portions of the magnetostrictive material 125 may be disposed alongside the shaft 120 in any suitable form, extent, location, and orientation to capture the compression transferred from the shaft 120 to the housing 105. In this way, rotation of the shaft 120 may be converted into mechanical stress and further converted into electrical charge through the use of the magnetostrictive material 125 embedded inside the housing 105. The pressure applied to the polarized crystals may produce a mechanical deformation, which in turn generates an electrical charge distribution producing a magnetic field inside and/or about the magnetostrictive material, which in turn may result in an electrical charge captured by one or more proximate conductors 130. The one or more proximate conductors 130 may be coupled to any suitable electrical/electronic components. Then, the electrical charge may be rectified and regulated to provide a reliable power supply. In such a manner, the magnetostrictive material may be a transition element between the mechanical and electrical domains. When mud or other fluid passes through the motor 100, the shaft 120 starts rotating. The rotary motion strains the elastomeric housing material. Due to the nature of the magnetostrictive material, the crystals may shift and realign, developing an electrostatic potential between the opposing faces of the element.

Magnetostrictive materials 125 may also damp the mechanical vibrations caused by the motor rotation. The vibrational mechanical energy may be converted and dissipated into electrical energy through magnetostrictive material 125. When the elastomer, and thereby the magnetostrictive material, is compressed due to the rotation of the shaft 120, electrical charge distribution may occur inside the magnetostrictive material 125, producing a magnetic field which in turn causes flow of electric current. Passive shunt networks may be the easiest and cost effective way of suppressing the vibrations.

Figure 3A:
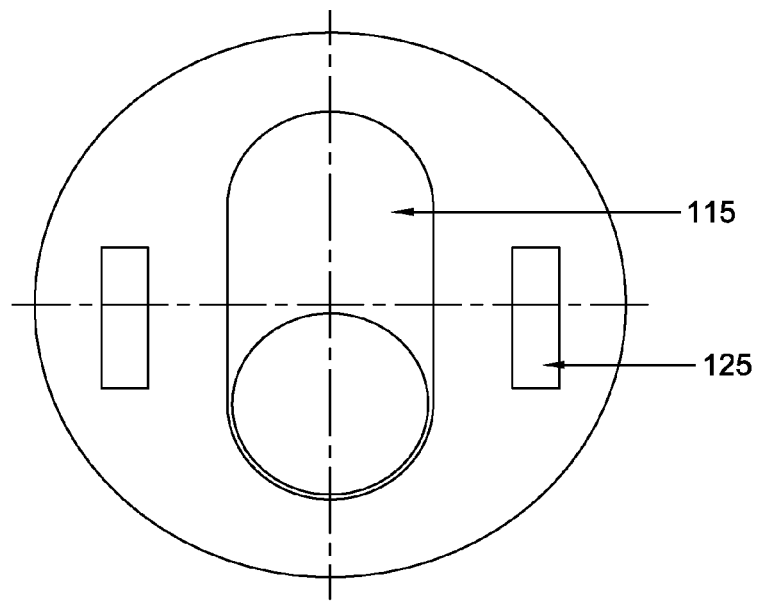
FIG. 3A depicts a partial cross-sectional view of one non-limiting example of the magnetostrictive material embedded in the elastomeric housing of an example positive displacement motor, in accordance with certain embodiments of the present disclosure.
Figure 3B:
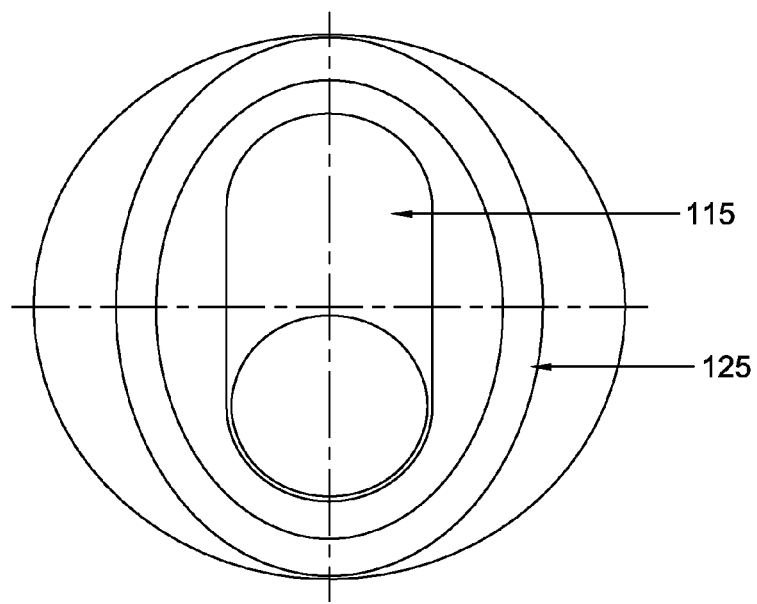
FIG. 3B depicts a partial cross-sectional view of another non-limiting example of the magnetostrictive material embedded in the elastomeric housing of an example positive displacement motor, in accordance with certain embodiments of the present disclosure

FIG. 3A depicts a partial cross-sectional view of one non-limiting example of the magnetostrictive material 125 embedded in the elastomeric housing 105 of an example positive displacement motor 100, in accordance with certain embodiments of the present disclosure. As depicted, the magnetostrictive material 125 may have a rectangular form and may be disposed alongside opposing sides of the cavity 115. FIG. 3B depicts a partial cross-sectional view of another non-limiting example of the magnetostrictive material 125 embedded in the elastomeric housing 105 of an example positive displacement motor 100. As depicted, the magnetostrictive material 125 may have a form that surrounds a portion of the shaft 120. Again, even though certain non-limiting examples are depicted, it should be understood that the magnetostrictive material 125 may implemented with any suitable form and orientation.

Figure 4:
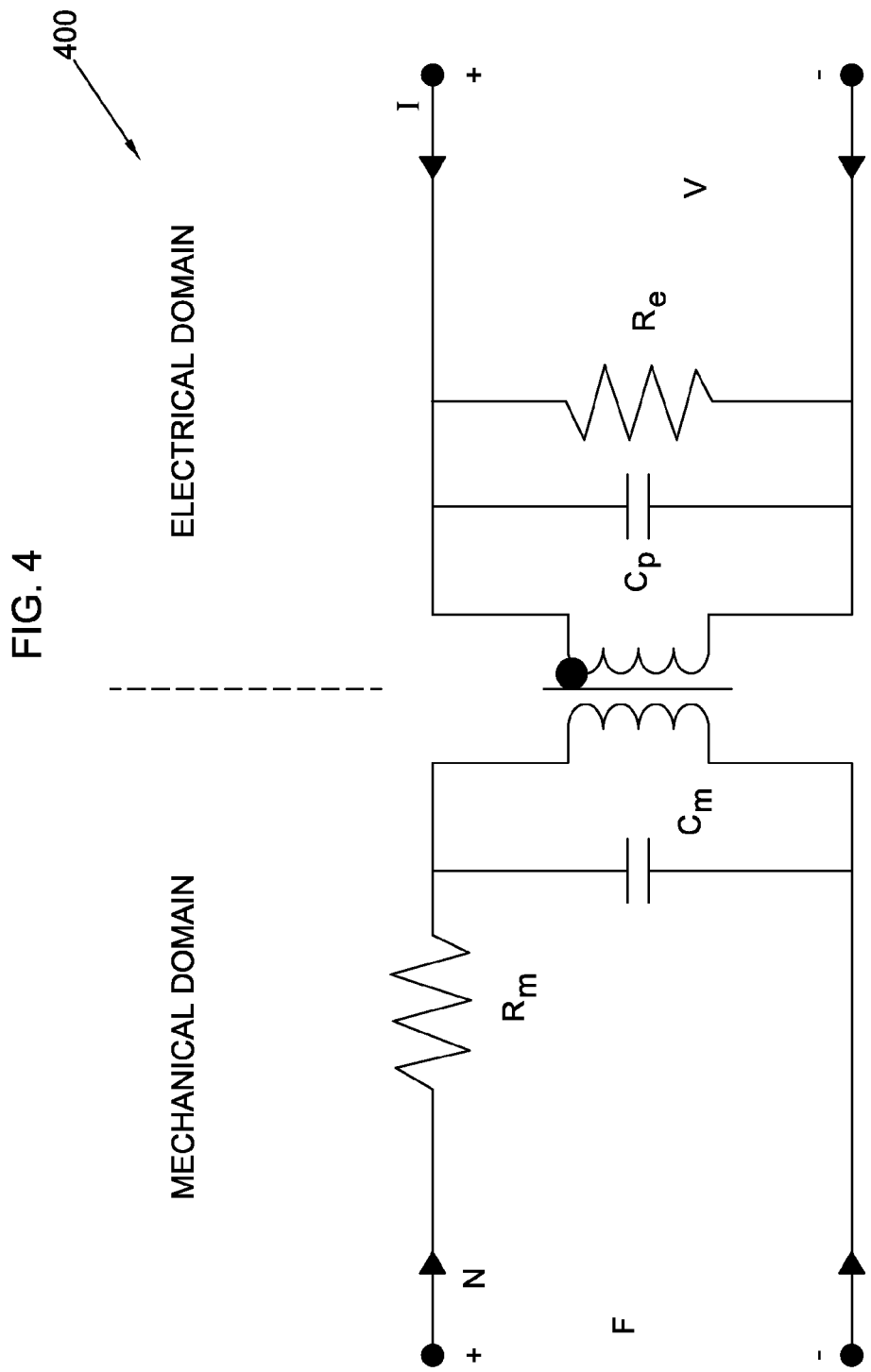
FIG. 4 depicts an example schematic circuit between the mechanical and electrical components of an exemplary coupled electromechanical system, in accordance with certain embodiments of the present disclosure.

FIG. 4 depicts an example schematic circuit 400 between the mechanical and electrical components of an exemplary coupled electromechanical system, in accordance with certain embodiments of the present disclosure. In the illustrated embodiment, the force F and voltage V across the magnetostrictive material may be the generalized effort variables, whereas the speed N and current I may be the generalized flow variables. In the mechanical domain, Rm may be the mechanical damping; Cm may be the compliance of the housing. In the electrical domain, Cp may be the capacitance; Rc may be dielectric loss. The transfer of energy from the magnetostrictive material to a storage element (not shown) such as a battery may be facilitated in any suitable manner.

With respect to the geometrical description and kinematical understanding of the power section of certain embodiments, contact forces may be needed to estimate the amount of force applied to the magnetostrictive material. The rubbing of the shaft with the housing element may result in the loss of useful power due to friction leakage losses. The main causes are the contact forces and the frictional forces. When the shaft is not rotating, the contacts between the shaft and housing elements may be along the seal lines. Thus, the housing surface may be rubbed over by the shaft surface continuously. As the winding ratio of the motor increases, the number of seal lines also increases. This further adds to the increase in the intensity of the rub.

The shaft and housing element may cause compressive contact stresses when the shaft rolls. Contact stresses are functions of shaft, housing geometry, material properties of housing element, shaft, surface treatment and the forces acting. Several mathematical models have been proposed by researchers to calculate the contact stresses. Because of the sliding velocity, the elastohydrodynamic effects present in the housing element alters the stress distribution. Another factor which alters the stress at the contact points is dynamic loading. The force $F_n$, acting on the contact point needs to be evaluated.

Figure 5:
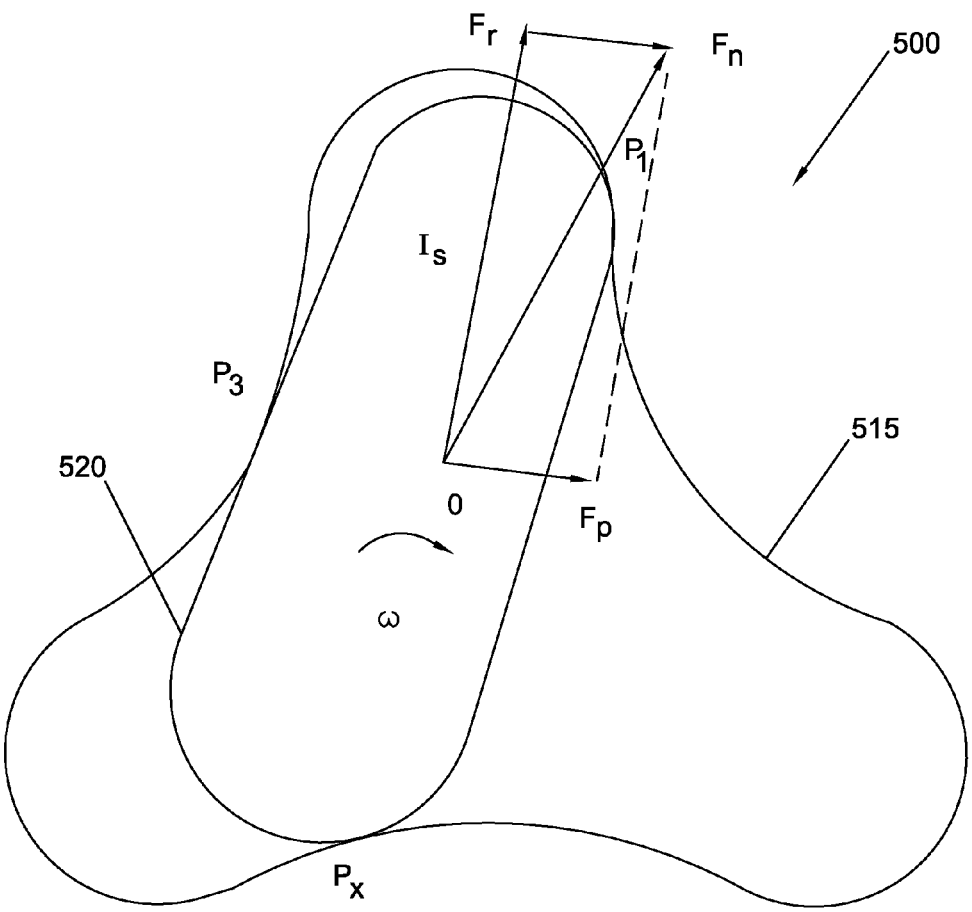
FIG. 5 depicts components of force acting on the housing of an example three-lobe motor, in accordance with certain embodiments of the present disclosure.

FIG. 5 depicts components of force acting on the housing 515 of an example three-lobe positive displacement motor 500, in accordance with certain embodiments of the present disclosure. The positive displacement motor 500 may correspond to the positive displacement motor 100 is many respects except those differences to a three-lobe configuration vis-à-vis a two-lobe configuration. The rotor mass eccentricity may cause a radial force, $F_r$, on the shaft 520. Also, the fluid pressure may cause a pressure thrust, $F_p$, on the shaft 520 which may further contribute to the force at the contact points. The shaft 520 may then transmit this rotating centrifugal force to the contact points of the housing 515 and shaft 520. Relatively small amounts of mass eccentricity in the shaft may cause unacceptable or even dangerous levels of contact forces at critical speed.

In certain exemplary embodiments, the radial force acting is given by:

$$F_r = 4\pi^2 A_s L(s) e \rho_{ms} N^2 \quad (1)$$

where
e=eccentricity,
As=area of the cross section of the shaft,
$\rho_{ms}$=mass density of the shaft, and
N=rotational speed per minute, rpm.

In certain exemplary embodiments, this radial force may be carried by the contacts throughout when the shaft rotates. The force due to the fluid pressure is given by:

$$F_p = \Delta p \times A_r \quad (2)$$

where
$\Delta p$=pressure difference between the cavities,
$A_r$=surface area in which pressure is acting=$2\pi r_s L(S)$, and
$L(S)$=length of the seal line.

In certain exemplary embodiments, the pressure force for a multilobe motor is:

$$F_P = \Delta p (2\pi r_s) i L(S) \quad (3)$$

The resultant force acting at the contact point is given by:

$$F_n = \pi L(S) d_s i \sqrt{\Delta p^2 + \left(\frac{d_s^2}{\sqrt{2}} \rho_s^2 e N^2\right)^2} \quad (4)$$

where
i=winding or configuration $$\text{ratio} = \frac{n}{n+1},$$

and
n=number of shaft lobes of the motor (winding number).

In order to quantify the degree of contact force between the shaft and housing, a term called "contact force intensity" is defined. Contact force intensity, CFI, is defined as the product of force at the contact point of shaft and housing element and the linear extent of the seal line, which is being rubbed. This is expressed mathematically:

$$CFI = \int_0^{L(s)} F_n 2\pi r \, ds \quad (5)$$

where
r=radius of the element, and
ds=the incremental distance along the seal line.

In certain exemplary embodiments, the rubbing intensity for a multilobe motor of (n+1) seal lines is given by:

$$CFI = \int_0^{L(s)} F_n 2(n+1)\pi r \, ds \quad (6)$$

Figure 6A:
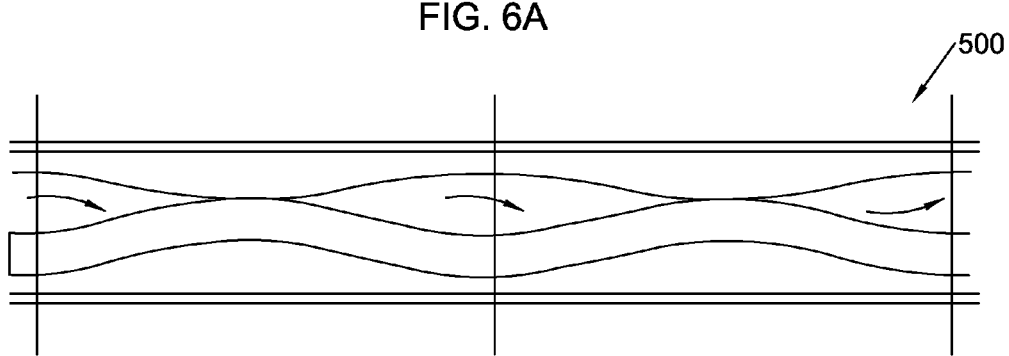
FIGS. 6A, 6B and 6C depict how strain is induced in the magnetostrictive material embedded in the housing of an example lobe motor, in accordance with certain embodiments of the present disclosure.
Figure 6B:
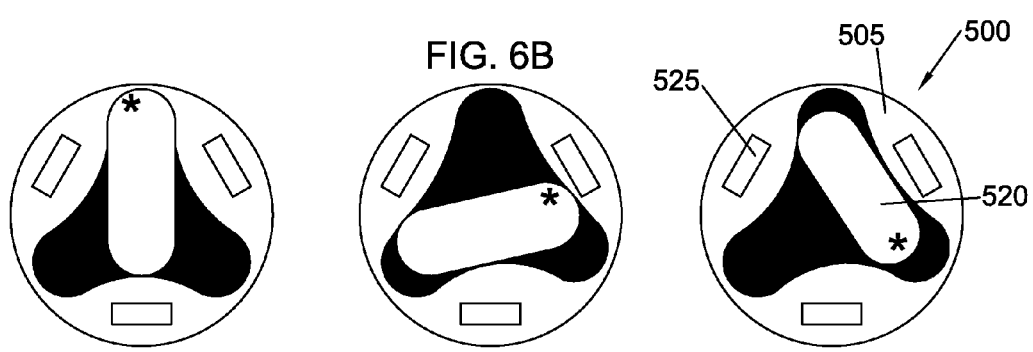
Figure 6B:
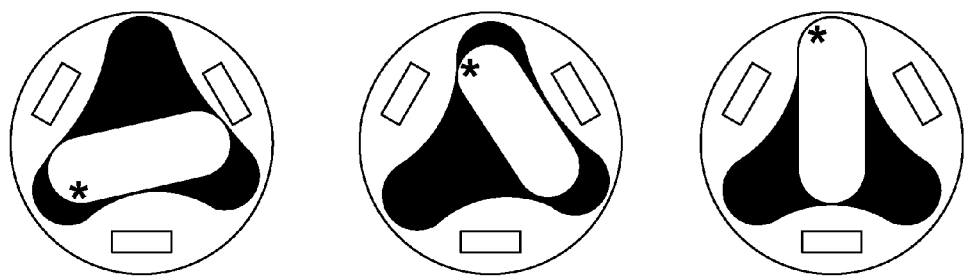
Figure 6C:
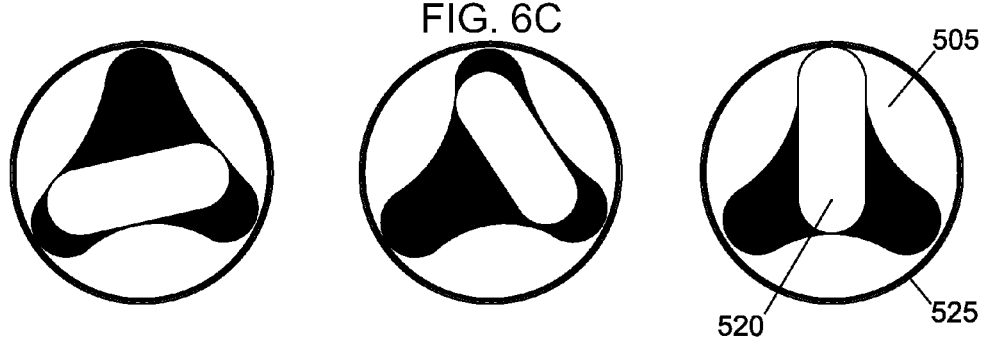

FIGS. 6A, 6B and 6C depict how strain is induced in the magnetostrictive material embedded in the housing of an example lobe motor 500, in accordance with certain embodiments of the present disclosure. Due to the contact forces, the magnetostrictive material may undergo strain as shown for an exemplary 2:3 lobe motor. FIG. 6A depicts a partial side cross-sectional view of an exemplary positive displacement motor 500. FIGS. 6B and 6C depict partial cross-sectional views of the exemplary positive displacement motor 500 with non-limiting examples of the magnetostrictive material 525 embedded in the elastomer in the housing 505 and showing the shaft 520 at varying positions during its rotation cycle. In FIG. 6B, the magnetostrictive material 525 is embedded at positions corresponding to portions of the housing 505 between the two of the plurality of lobes. In FIG. 6C, the magnetostrictive material 525 is embedded to encircle a portion of the shaft 520.

In certain exemplary embodiments, the number of magnetostrictive material units embedded in the motor may be a function of the number of lobes in the power section of the motor.

In general, the number of magnetostrictive crystals that can be placed is given by:

$$N_{peizo} = n \times N_c \quad (7)$$

where
N$_{peizo}$=number of magnetostrictive crystals, and
N$_c$=number of stages in the motor.

Figure 7:
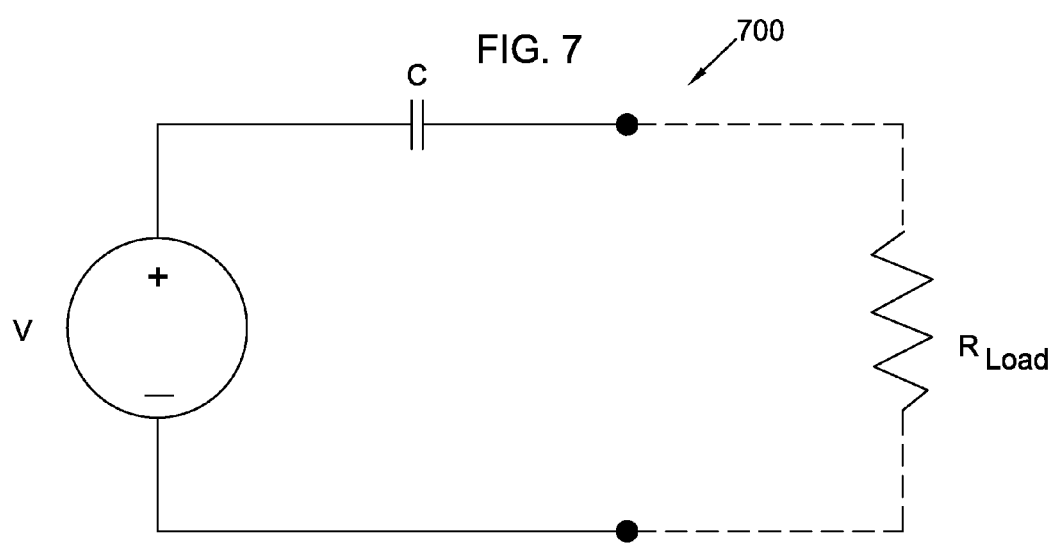
FIG. 7 depicts an example magnetostrictive voltage output diagram, in accordance with certain embodiments of the present disclosure.

In certain exemplary embodiments, an applied force may produce a voltage V=Qf/C, where Qf is the charge resulting from the force and C is the capacitance of the device. FIG. 7 depicts an example magnetostrictive voltage output diagram 700, in accordance with certain embodiments of the present disclosure. In certain exemplary embodiments, the charge sensitivity or the magnetostrictive constant d defined as the charge generated per unit force applied is given by:

$$d = \frac{Q}{f} \quad (8)$$

where
Q=charge developed.

In certain exemplary embodiments, the voltage sensitivity is defined as the field produced per unit stress applied and is given by the following equation:

$$g = \frac{\frac{V}{t}}{\sigma} = \frac{\frac{V}{t}}{\frac{f}{wl}} \text{ therefore } g = \frac{Vwl}{f \times t} \quad (9)$$

but capacitance $$C = k\varepsilon \frac{area}{distance}$$

so $$g = \frac{V}{\varepsilon f} \frac{C}{k} = \frac{Q}{k \times \varepsilon f} = \frac{d}{k \times \varepsilon}$$

where
t=thickness of the transducer,
l=length,
w=width,
∈=dielectric constant,
C=capacitance formed in the transducer, and
Q=charge developed.

In certain exemplary embodiments, multiple assemblies may be placed in parallel in the stator which can generate enough power to drive downhole tools continuously. In certain exemplary embodiments, the differential pressure across the motor may be dependent on the weight on bit (WOB). The relationship between the pressure drop across the motor in terms of the WOB given below may be used to further calculate the contact force across the seal line.

$$\Delta p_{mot} = K_{rc} \left( \frac{W^x d_b^y}{D_h^2 p_h \eta} \right), \quad (10)$$

where, $$Krc = \left( \frac{K_x K_b}{K_y K_i} \right) \& K_i = i \left( \frac{1+i}{(2-i)^2} \right) \quad (11)$$

d$_b$=diameter of the bit, in,
D$_h$=diameter of the housing, in.,
p$_h$=pitch of the housing, in.,
i=winding ratio/configuration,
K$_b$=formation hardness, teeth, bearing, mud coefficient,
K$_i$=winding ratio coefficient,
K$_{rc}$=pressure drop coefficient
K$_x$=constant, (5252)
K$_y$=constant, (0.01)
Q=flow rate, cu.in.,
η=overall efficiency.

Accordingly, certain embodiments of the present disclosure allow for harvesting mechanical energy downhole and generating electrical power therefrom. And even though the figures may depict embodiments of the present disclosure in a particular orientation, it should be understood by those skilled in the art that embodiments of the present disclosure are well suited for use in a variety of orientations. Accordingly, it should be understood by those skilled in the art that the use of directional terms such as above, below, upper, lower, upward, downward and the like are used in relation to the illustrative embodiments as they are depicted in the figures, the upward direction being toward the top of the corresponding figure and the downward direction being toward the bottom of the corresponding figure.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that the indefinite article introduces.

What is claimed is:

1. A system to harvest energy from shaft rotation, the system comprising:
    a housing;
    a curved shaft disposed within the housing; and
    a magnetostrictive material embedded in the housing;
    wherein a rotation of the curved shaft strains the magnetostrictive material, generating an electrical current in a conductor disposed proximate to the magnetostrictive material.

2. The system to harvest energy from shaft rotation of claim 1, wherein the housing comprises an elastomeric material.

3. The system to harvest energy from shaft rotation of claim 1, wherein the system is implemented with a positive displacement motor.

4. The system to harvest energy from shaft rotation of claim 1, wherein the magnetostrictive material encircles the curved shaft.

5. The system to harvest energy from shaft rotation of claim 1, wherein the magnetostrictive material surrounds a portion of the curved shaft.

6. The system to harvest energy from shaft rotation of claim 1, wherein the housing comprises a plurality of lobes.

7. The system to harvest energy from shaft rotation of claim 6, wherein the magnetostrictive material is at a position corresponding to a portion of the housing between two of the plurality of lobes.

8. The system to harvest energy from shaft rotation of claim 6, wherein a number of the magnetostrictive material is a function of a number of the plurality of lobes.

9. A method of harvesting energy from shaft rotation, the method comprising:
 providing a housing;
 providing a curved shaft disposed within the housing; and
 providing a magnetostrictive material embedded in the housing with a conductor disposed proximate to the magnetostrictive material;
 rotating the curved shaft, wherein the rotation strains the magnetostrictive material, generating an electrical current in the conductor.

10. The method of harvesting energy from shaft rotation of claim 9, wherein the housing comprises an elastomeric material.

11. The method of harvesting energy from shaft rotation of claim 9, further comprising:
 providing the housing, the curved shaft, and the magnetostrictive material in a positive displacement motor.

12. The method of harvesting energy from shaft rotation of claim 11, wherein the positive displacement motor is useable in a wellbore.

13. The method of harvesting energy from shaft rotation of claim 9, wherein the magnetostrictive material encircles a portion of the curved shaft.

14. The method of harvesting energy from shaft rotation of claim 9, wherein the magnetostrictive material surrounds a portion of the curved shaft.

15. The method of harvesting energy from shaft rotation of claim 9, wherein the housing comprises a plurality of lobes.

16. The method of harvesting energy from shaft rotation of claim 15, wherein the magnetostrictive material is at a position corresponding to a portion of the housing between two of the plurality of lobes.

17. The method of harvesting energy from shaft rotation of claim 15, wherein a number of the magnetostrictive material is a function of a number of the plurality of lobes.

18. A positive displacement motor comprising:
 a housing having a cavity;
 a shaft disposed within the cavity; and
 a magnetostrictive material embedded in the housing to be strained due to rotation of the shaft and produce electrical energy;
 wherein the housing comprises a plurality of lobes and the magnetostrictive material is at a position corresponding to a portion of the housing between two of the plurality of lobes.

19. The apparatus of claim 18, wherein the housing comprises an elastomeric material.

* * * * *